3,285,756
MOLD OR CORE COMPOSITION FOR METAL CASTING PURPOSES
Rolf Erhard Morén, Alfredshem, Sweden, assignor to Mo Och Domsjö A.-B., Ornskoldsvik, Sweden, a corporation of Sweden
No Drawing. Filed Apr. 29, 1963, Ser. No. 276,211
Claims priority, application Sweden, Jan. 2, 1961, 21/61; May 9, 1962, 5,211/62; Great Britain, Nov. 21, 1960, 40,003/60
19 Claims. (Cl. 106—38.5)

This application is a continuation-in-part of application Serial No. 152,665, filed November 15, 1961, now U.S. Patent No. 3,179,523, dated April 20, 1965, and Serial No. 159,467, filed December 14, 1961, now U.S. Patent No. 3,196,505, dated July 27, 1965.

The present invention relates to the art of making molds and cores for casting metals and is more particularly concerned with the use of special binders in mold and core mixes.

It is well known to use e.g. glucose as a binder in the foundry industry and it is also known to use together with the glucose certain salts which are decomposed on heating to liberate a strong inorganic acid. Examples of such salts are ammonium sulfate and ammonium phosphate which when heated give off ammonia which leaves in a gaseous condition. If ammonium sulfate is used, sulfuric acid is liberated which has a hardening effect on the glucose. The disadvantage of this method is the strong odor of ammonia developed during hardening. Also, the ammonium salts are not stable in storage, and complete powdered binders, which must be capable of being stored for an indefinite time, cannot be prepared by that method.

The object of the present invention is to provide a binder composition based on glucose which is free from the disadvantages of the prior art binders referred to above and also has other advantages as will appear from the following description.

The binders of the present invention are primarily intended to be used for making cores by the hot core-box method but can also be used for making cores and molds which are baked by heating in the conventional manner or allowed to self-harden.

According to the present invention, glucose or other simple sugars are used as binders in core and mold compositions in the presence of substances which provide calcium ions and hydroxide ions. It was found that when glucose is admixed together with, e.g., calcium hydroxide and water to a composition consisting essentially of sand or other particulate mineral material, such as olivine, and this composition is heated, there occurs in a very short time a hardening of the composition, which is probably due to a decomposition of the sugar and polymerization of the decomposition products thus formed. Instead of calcium hydroxide it is of course possible to use calcium oxide which forms calcium hydroxide with the water present in the mixture. It is also possible to use a calcium salt, such as calcium chloride, together with an alkali, such as sodium hydroxide.

The above-mentioned hardening can also take place at a lower temperature, although in that case of course at a lower rate, wherefore the method can also be used for making cores and mold elements which harden by themselves at room temperatures, but of course the method is most advantageous for making cores in a hot core-box or when the core or mold is heat-cured by other means.

To make the sand mix moldable, i.e. to increase its impact strength and green strength, and also to increase its dry strength it is often suitable to use, in combination with the sugar, a polysaccharide, e.g. a water soluble cellulose derivative, alginic acid derivative, pectin, carragheen moss, gum tragacanth, gum arabic, agar or gelatin.

The use of a cellulose derivative together with glucose provides several interesting and practical advantages. Surprisingly, it was found that the glucose has the ability of reducing the amount of water required in the core or mold mix. Since many binders, e.g. water-soluble cellulose derivatives, normally often require 3 to 6% moisture in the sand to be utilizable, the advantages of being able to use only 1.5 to 4% moisture by the combination of glucose and cellulose derivatives are obvious.

To obtain various other properties in the core or mold mix it may sometimes be suitable to combine the binder of the present invention with other conventional binders, such as core oils (e.g. linseed oil, esterified tall oil), carbohydrates (e.g. starch products, higher sugars, dextrin or molasses), protein substances (e.g. caseinates, collagen glue), natural resins (e.g. rosin, tall oil rosin), plastics (e.g. furfural formaldehyde, melamin formaldehyde, urea formaldehyde, phenol formaldehyde, polyvinyl and polyacrylic plastics), silicic acid derivatives (e.g. water glass, ethyl silicate), clays (e.g. natural clay, bentone clay, kaolin, bentonite) and other products, such as sulfite waste liquor, sorel cement, Portland cement, aluminate cement or gypsum.

Suitable cellulose derivatives include, e.g. methyl-ethylcellulose, ethylcellulose, hydroxyethylcellulose, methylhydroxyethylcellulose, ethyl-hydroxyethylcellulose, methyl-hydroxypropylcellulose, water-soluble salts of cellulose ether carboxylic acids and cellulose sulfuric esters, cyanoethylcellulose and sulfoethylcellulose.

In some compositions according to this invention it has been found suitable to incorporate a surface-active agent of any commercially available types, either anionic, cationic or nonionic.

The use of cement in the compositions also results in an interesting effect. In this case, the cement does not contribute to any essential increase in strength, but serves as a water-absorbing agent when using the present invention for the manufacture of cores by the hot core-box method or for self-hardening core or mold mixes.

The necessary amount of the sugar may be from about 0.1 to about 8% by weight of the amount of sand. In the practical use of e.g. glucose it is usually advantageous that the amount of calcium hydroxide added does not exceed about a quarter of the amount of glucose. Usually, the amount of calcium hydroxide may be lower, e.g. one-tenth of the amount of glucose. When the binder is combined with a water-soluble polysaccharide, such as a water-soluble cellulose derivative, it should be used in an amount of between 0.01 and 3% by weight of the amount of sand. The addition of cement should be kept low and amount to about 0.5 and 4% by weight.

The invention is illustrated by the following examples.

EXAMPLE I

To 100 kg. of sand ("Baskarp No. 6") were added, during a mixture time of 5 minutes, 1.5 kg. of glucose, 1.0 kg. of dry clay, 0.2 kg. of a low-viscosity hydroxyethylcellulose, 0.2 kg. of calcium hydroxide and 2.0 kg. of water. The green compression strength of the mix was 0.50 kg. per sq. mm.

The core sand mix was used to form standard test cores for determining transverse strength by the SMF standard method for testing core and mold mixes. After baking at 200° C. for half an hour, a transverse strength of 136 g. per sq. mm. was obtained. The edge hardness of the test cores was very high.

A number of test cores were made by means of a core making machine and the "hot core-box method." These test cores had a transverse strength of 180 g. per sq. mm. after curing for 30 seconds in the core-box and storage for 3 hours at room temperature. The edge hardness of the test cores was very high.

At the same time, a core mix according to the same formulation, but without calcium hydroxide, was tested. A test in a hot core-box with this core sand mix showed that the mix was not hardened throughout in the core-box, the cores being spoiled when removed from the box.

EXAMPLE 2

Sand: "Baskarp No. 6," 100 kg. Binders: According to A–D below.
Mixing time: 5 min. Baking time: 30 min. Baking temperature: 200° C.

| Mix | Glucose, kg. | Kaolinite (dry clay), kg. | Portland cement, kg. | Calcium hydroxide, kg. | Hydroxyethyl-cellulose, kg. | Moisture, kg. | Green compression strength, g./mm.$^2$ | Transverse strength, g./mm.$^2$ | Edge hardness |
|---|---|---|---|---|---|---|---|---|---|
| A | 2.0 | 1.0 | 1.0 | 0.1 | 0.0 | 3.0 | 0.95 | 133 | 2 |
| B | 2.0 | 1.0 | 1.0 | 0.1 | 0.2 | 3.0 | 0.48 | 268 | 3 |
| C | 2.0 | 1.0 | 1.0 | 0.1 | 0.4 | 3.0 | 0.52 | 354 | 4 |
| D | 2.0 | 1.0 | 1.0 | 0.1 | 0.6 | 3.0 | 0.56 | 441 | 4 |

Edge hardness ratings:
 Highest edge hardness=4.
 Lowest edge hardness=0.
Cores made according to SMF standards.
All core mixes, except A, can advantageously be used for making core in a hot core-box.

EXAMPLE 3

Sand: "Baskarp No. 6" _____ kg__ 100
Mixing time _____ minutes__ 5
Baking time _____ do____ 30
Baking temperature, ° C. _____ 200
Binders:
  Glucose _____ kg__ 2.0
  Hydroxyethylcellulose _____ kg__ 0.2
  Borax _____ kg__ 0.5
  Water _____ kg__ 2.0
  Calcium hydroxide _____ kg__ 0.1
Green compression strength _____ g./mm.$^2$__ 0.47
Transverse strength _____ g./mm.$^2$__ 380
Edge hardness _____ 4

The binder combination is useful for both the hot core-box method and conventional heat-curing.

EXAMPLE 4

Sand: "Baskarp No. 6" _____ kg__ 100
Mixing time _____ minutes__ 5
Binder combination:
  Glucose _____ kg__ 2
  Hydroxyethylcellulose _____ kg__ 0.3
  Calcium hydroxide _____ kg__ 0.2
  Portland cement _____ kg__ 2.0
  Water _____ kg__ 3.5
Green compression strength _____ g./mm.$^2$__ 0.57
Transverse strength after minutes baking at
  200° C. _____ g./mm.$^2$__ 230

Hardens at room temperature after about 12 hours.

EXAMPLE 5

Sand: "Baskarp No. 6," 100 kg.
Mixing time: 5 minutes.
Baking time: 30 minutes.
Baking temperature: 200° C.

| Mix | Thermosetting melamine-formaldehyde plastic, kg. | Glucose, kg. | Calcium hydroxide, kg. | Kaolinite (dry-clay), kg. | Hydroxyethyl cellulose (low-viscosity), kg. | Water, kg. | Green compression strength, g./mm.$^2$ | Transverse strength, g./mm.$^2$ | Edge hardness |
|---|---|---|---|---|---|---|---|---|---|
| A | 0 | 2.0 | 0.1 | 2.0 | 0.3 | 3.0 | 0.43 | 423 | 3 |
| B | 0.5 | 2.0 | 0.1 | 2.0 | 0.3 | 3.0 | 0.51 | 451 | 4 |
| C | 0.5 | 2.0 | 0.1 | 2.0 | 0.3 | 3.0 | 0.47 | 523 | 4 |

All formulations are suitable for curing in an oven and for hot core-box. In the latter case, the addition of water should be lowered to 2.0 to 2.5 kg.

I claim:
1. A binder composition for use in forming mold members for metal casting, and based upon a glucose as the binder, consisting essentially of glucose and calcium compound selected from the group consisting of calcium oxide, calcium hydroxide, and mixtures of calcium salt and an alkali metal hydroxide forming calcium hydroxide in water in an amount to provide from about 5% to about 25% calcium hydroxide by weight of the glucose, the calcium compound being in an amount to react with the glucose to harden the composition in the presence of water and sand.

2. A binder composition in accordance with claim 1 in which the calcium compound is calcium hydroxide.

3. A binder composition in accordance with claim 1 in which the calcium compound comprises an inorganic calcium compound and an alkali metal hydroxide reacting in situ to provide the calcium hydroxide.

4. A binder composition in accordance with claim 3 in which the calcium compound is calcium chloride.

5. A binder composition for use in forming mold members for metal casting, and based upon a glucose as the binder, consisting essentially of a glucose, a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose, and up to 37.5% by weight of the glucose of a water-soluble polysaccharide, the calcium compound being in an amount to react with the glucose to harden the composition in the presence of water and sand.

6. A binder composition in accordance with claim 5 in which the amount of water soluble polysaccharide is within the range from about 10% to about 37.5% by weight of the glucose.

7. A binder composition in accordance with claim 5 in which the water-soluble polysaccharide is a hydroxyalkyl cellulose derivative.

8. A binder composition in accordance with claim 7 in which the hydroxyalkyl cellulose derivative is hydroxyethylcellulose.

9. A binder composition for use in forming mold members for metal casting, and based upon a glucose as a binder, consisting essentially of a glucose, a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose, and an amount up to 100% by weight of the glucose of a cement, the said composition being capable of forming a mold member upon combination with particulate mineral material and water, and the calcium compound being in an amount to react with the glucose to harden the composition in the presence of water and sand.

10. A binder composition for use in forming mold members for metal casting, and based upon a glucose as a binder, consisting essentially of a glucose, a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose, and an amount up to 100% by weight of the glucose of a clay, the calcium compound being in an amount to react with the glucose to harden the composition in the presence of sand.

11. A binder composition for use in forming mold members for metal casting, and based upon a glucose as a binder, consisting essentially of a glucose, a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose and an amount up to 100% by weight of the glucose of a thermoplastic resin, the calcium compound being in an amount to react with the glucose to harden the composition in the presence of water and sand.

12. A binder composition for use in forming mold members for metal casting, and based upon a glucose as the binder, consisting essentially of a glucose, a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose, and an amount up to 100% by weight of the glucose of a thermosetting resin, the calcium compound being in an amount to react with the glucose to harden the composition in the presence of water and sand.

13. A mold member composition based upon a glucose as a binder, consisting essentially of sand, water, from about 0.1 to about 8% of a glucose, and a calcium compound selected from the group consisting of calcium oxide, calcium hydroxide, and mixtures of calcium salt and an alkali metal hydroxide forming calcium hydroxide in water in an amount to provide from about 10% to about 25% calcium hydroxide by weight of the glucose, the amount of calcium compound being sufficient to react with the glucose to harden the composition and bond the sand to form the mold member.

14. A method of making mold members for use for metal castings and bonded together by a binder based upon a glucose, which comprises forming into the desired mold shape a mix consisting essentially of sand, water, from about 0.1 to about 8% by weight of the sand of a glucose, and an amount of calcium compound to provide from about 10% to 25% calcium hydroxide by weight of the glucose to harden the composition in the presence of the water; and reacting said glucose with the calcium hydroxide in situ to form a calcium hydroxide-glucose reaction product in an amount sufficient to bond the sand and form the mold member.

15. A method in accordance with claim 14 in which the alkaline calcium compound is calcium oxide.

16. A process in accordance with claim 14 in which the alkaline calcium compound is calcium hydroxide.

17. A process in accordance with claim 14 in which the binder mix comprises a water-soluble polysaccharide in an amount within the range from about 0.01 to about 3% by weight of the sand.

18. A process in accordance with claim 14 in which the binder mix includes cement in an amount within the range from about 0.5 to about 4% by weight of the sand.

19. A mold member for use in metal casting, consisting essentially of sand bonded together by a binder based upon a glucose and consisting essentially of the in situ reaction product of a glucose and calcium hydroxide in an amount within the range from about 10% to about 25% by weight of the glucose.

References Cited by the Examiner

UNITED STATES PATENTS

| 3,112,206 | 11/1963 | Mocsny | 106—38.5 |
| 3,179,523 | 4/1965 | Moren | 106—38.35 |
| 3,196,505 | 7/1965 | Moren | 106—38.35 XR |

FOREIGN PATENTS

| 754,823 | 8/1956 | Great Britain. |

ALEXANDER H. BRODMERKEL, *Primary Examiner.*

MORRIS LIEBMAN, *Examiner.*

J. B. EVANS, *Assistant Examiner.*